Jan. 22, 1963 W. COTTER 3,075,047

TELEPHONE CALL PRIORITY INDICATOR

Filed March 23, 1960 2 Sheets-Sheet 1

INVENTOR.
WILLIAM COTTER

BY

ATTORNEYS

TELEPHONE CALL PRIORITY INDICATOR

Filed March 23, 1960 2 Sheets-Sheet 2

INVENTOR.
WILLIAM COTTER
BY Williams, Tilbury & Dobrick
ATTORNEYS 3,075,047
Patented Jan. 22, 1963

3,075,047

TELEPHONE CALL PRIORITY INDICATOR

William Cotter, 6737 Maplewood Road, Cleveland, Ohio

Filed Mar. 23, 1960, Ser. No. 17,075
11 Claims. (Cl. 179—51)

This invention relates in general to means for processing incoming telephone calls, and more particularly to means for visually indicating elapsed time between receipt of an incoming call and transfer of said call to an internal line.

Telephone switchboard devices are designed to receive a predetermined number of incoming calls and to hold these calls until they are relayed to inside lines. Normally, switchboards include a bank of pilot lights which are energized when incoming calls are received, each of said lights remaining energized until the call which it identifies is transferred to an inside line.

During peak load periods, incoming calls are sometimes placed faster than the switchboard operator can relay them. Under such conditions, it is not always possible for the switchboard operator to remember the order of placement of the waiting calls. Thus, inequities arise wherein the last placed call might be the first answered and vice versa.

In order to service incoming calls on a "first in-first out" basis it has been recognized that some form of priority telephone call indicator is desirable. I am aware that there are such devices in the prior art, but to the best of my knowledge all of these devices are complex, and costly to build and to service. I have designed my device with an emphasis on simplicity consistent with reliability. Thus, with very simple expedients I have devised a telephone call priority indicator which will provide a visual signal available not only for the use of the telephone operator, but for use in a large room or office. With telephone sets having individual button line switching means, a system may be installed wherein anyone may transfer a waiting incoming call to his own telephone set, assisted by elapsed time visual signal means which can be seen from any place in an office. It is thus possible, through cooperation of those persons having such line switching telephones at their disposal, to note the order in which incoming calls have been received and to answer the calls in that order.

It is, therefore, an object of my invention to provide: a telephone call priority indicator which eliminates the complicated relay embodiments of the prior art devices; a telephone call priority indicator which is based on simple mechanical and electro-mechanical principles; a telephone call priority indicator which combines a high degree of reliability with corresponding simplicity of mechanism; and a telephone call priority indicator adapted to co-act with standard telephone call receiving equipment.

Other objects and advantages will be evident from the following description of the preferred form of the invention.

The features of this invention which are believed to be novel are set forth with particularity in the appended claims. The invention itself, however, both as to its organization and use, together with further objects and advantages thereof, may best be understood by reference to the following description taken in conjunction with the following drawings, in which:

My invention is predicated on co-action with standard prior art telephone call receiving equipment having incoming telephone call signal means. Usually in equipment of this type, a pilot light is energized when an incoming call is received, said light remaining energized until the call is transferred to an inside line. For the operation of my invention I may utilize, by means of a photoelectric cell, the energy transmitted from the said telephone pilot light, or more preferably a direct electrical connection may be made from my invention to the lines servicing the panel of pilot lights.

Figure 1:
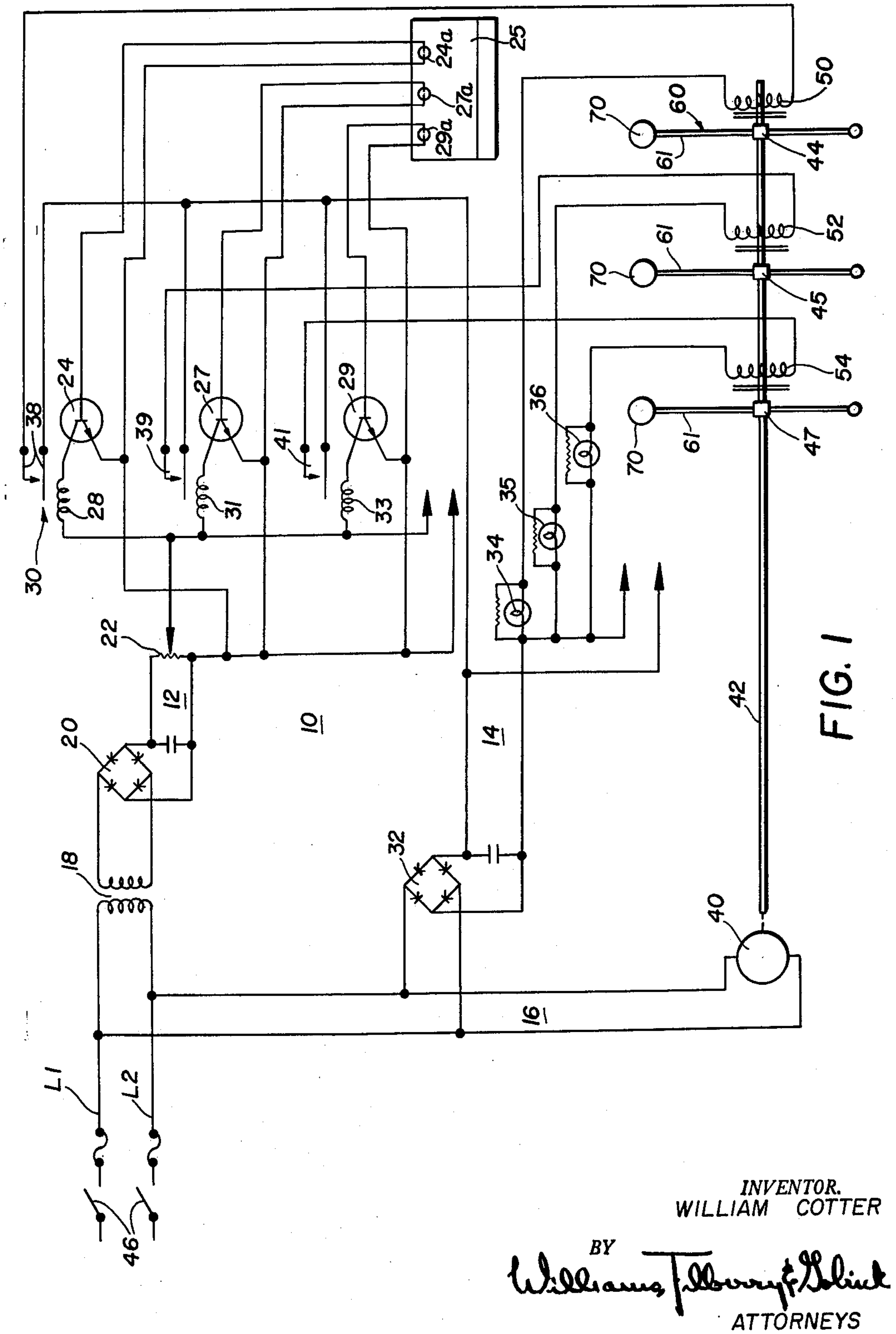
FIGURE 1 is a schematic diagram of a preferred embodiment of my invention.

Referring now to the figures in greater detail, and to FIGURE 1 in particular, it will be seen that I provide in association with a source of alternating current, lines indicated L1 and L2, and overall circuitry 10 which, for the purpose of analysis and description, will be more specifically referred to as sub-circuits 12, 14 and 16.

Referring now to sub-circuit 12, alternating current from lines L1 and L2 is rectified to direct current by step down transformer and rectifier means 18 and 20. Tapped from potentiometer means 22 are a plurality of electronic valve means 24, 27 and 29 corresponding in number to the number of lines which the basic telephone call receiving unit 25 is designed to service. I prefer to employ as valve means 24 a semi-conductor such as a Sylvania 2N35 transistor or the equivalent which is connected between the basic unit 25 and magnetic coil 28, which is a portion of relay 30. It is to be understood, of course, that vacuum tube means may be used in lieu of transistor means 24, and thus this element is referred to generically as an electronic valve.

With the description thus far set forth, it is apparent that a signal from the basic receiving unit 25 will operate the electronic valve 24 to energize the magnetic coil 28 of relay 30. As aforesaid, additional electronic valve means 27 and 29, identical to valve means 24 are provided, each corresponding to an incoming call signal line in the unit 25. Pilot lights 24*a*, 27*a* and 29*a* are independently energized upon receipt of incoming calls, as is well understood by those skilled in the art.

Referring now to sub-circuit 14, alternating current from lines L1 and L2 is converted to direct current by rectifier means 32 to operate pilot lights 34, 35 and 36, and electromagnets 50, 52 and 54. The circuits are normally open, by virtue of the inclusion of normally open contacts 38, 39 and 41, until relay electromagnetic coils 28, 31 and 33 are energized by the actuation of electronic valves 24, 27 and 29 respectively.

Sub-circuit 16 is energized by lines L1 and L2 to operate a motor 40. The motor 40 is in turn drivingly connected to a non-ferrous shaft 42 to which is secured a plurality of ferromagnetic cylinders 44, 45 and 47, corresponding in number to the number of telephone lines provided in the basic unit 25. Electromagnets 50, 52 and 54 are positioned adjacent cylinders 44, 45 and 47 respectively.

In operation, line switch 46 is closed to immediately energize sub-circuit 16. Upon the receipt of a call in a circuit of the basic unit 25 as monitored, for instance, by pilot light 24*a*, electronic valve 24 is actuated to energize relay coil 28, thereby causing contacts 38 to close. When contacts 38 of relay 30 close, pilot light 34 will be energized as will electromagnet 50. Ferromagnetic cylinder 44 is positioned within the magnetic field of electromagnet 50 as is a ferromagnetic time lapse indicator 60 adjacent cylinder 44, to co-act therewith.

The time lapse indicator may be any of several embodiments, the essential features being that it is ferromagnetic and adapted to be driven by cylinder 44. For instance, in FIGURE 2, the time lapse indicator is a slender ferromagnetic rod which is drawn into driving engagement with cylinder 44 upon energization of electromagnet 50.

Inasmuch as ferromagnetic cylinder 44 is constantly rotating, as soon as a selected cylinder (44) is energized by a corresponding electromagnet (50), the corresponding time lapse indicator rod 61 is slowly urged upwardly until such time as the call corresponding to the particular circuit is transferred by the telephone operator to an inside line. Any type of easily observable indicia such as a grid 68 may be employed in connection with the movement of the time lapse indicator rod 61. Thus, a plurality of horizontally aligned, vertically spaced bars may indicate periods of one minute each so that it is readily apparent from an inspection of the spherical top 70 of time lapse indicator rod 61 the number of minutes a particular call has been waiting internal connection.

Figure 3:
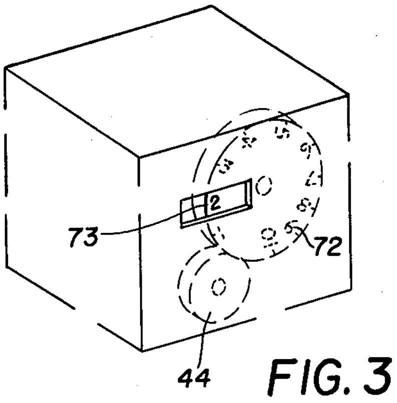
FIGURE 3 is another means for actuating the visual component of my invention.
Figure 4:
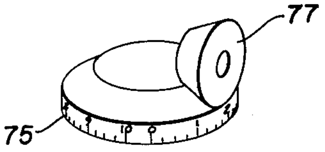
FIGURE 4 is yet another means for actuating the visual component of my invention.

By way of another example of a time lapse indicator, a second ferromagnetic cylinder 72 may be positioned in driving engagement with the drive cylinder 44 having suitable time lapse indicia 73 imprinted on this outer periphery. This indicator cylinder may be either tangential to the drive cylinder 44, as shown in FIGURE 3, or may be normal thereto as shown in FIGURE 4, wherein indicator cylinder 75 is mitered to be driven by a matching mitered drive cylinder 77.

Figure 2:
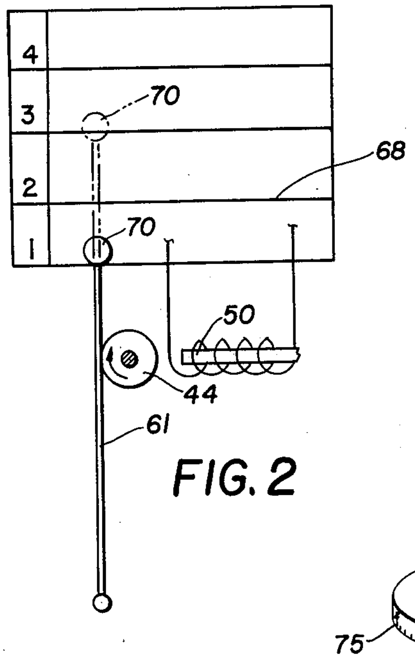
FIGURE 2 is a schematic diagram of a preferred means for operating the visual component of my invention.

Other more complex indicia or time lapse indicating means are contemplated and may be employed such as an arrangement whereby the drive cylinder actuates a series of lights after every predetermined interval of one minute or less, and it is readily anticipated that many other such arrangements may be called to mind upon a reading of this specification. However, simplicity is the watch-word of this invention, and simple indicating means such as shown in FIGURES 2, 3 and 4 are preferred embodiments. After an incoming call has been connected to an inside line, the corresponding basic unit pilot light circuit, by means not a portion of this invention, will become deenergized and the field about the electromagnet 50 will collapse. Thereafter, time lapse indicator 60 will return to its position of rest. In the case of the indicator in FIGURE 2, the rod 61 will return by force of gravity, whereas with the cylindrical indicators 73 and 75, a simple spring return mechanism may easily be adapted to this end.

Thus, it will be seen that I have provided a telephone call priority indicator which is simple in principle and construction. It will indicate the relative status of all incoming calls at all times, as well as the actual elapsed time each call has been held in the basic unit 25 prior to being transferred to an inside line.

Figure 5:
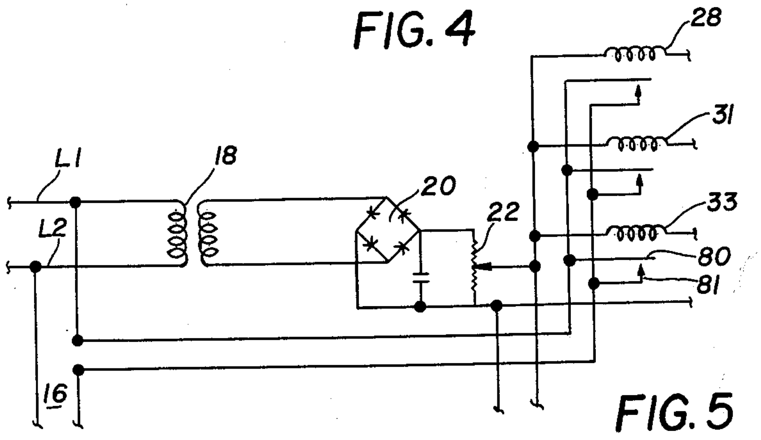
FIGURE 5 is a fragmentary schematic diagram of a modified portion of the diagram shown in FIGURE 1.

If for any reason it is desirable that the motor 40 not be maintained in a continuously running ready condition, it is further contemplated that additional relay contacts 80 and 81 (FIGURE 5) may be included in subcircuit 16 to be closed upon actuation of any of electromagnetic coils 28, 31 or 33 respectively, wherein motor 40 will only drive shaft 42 upon receipt in the system of an unanswered signal.

Figure 6:
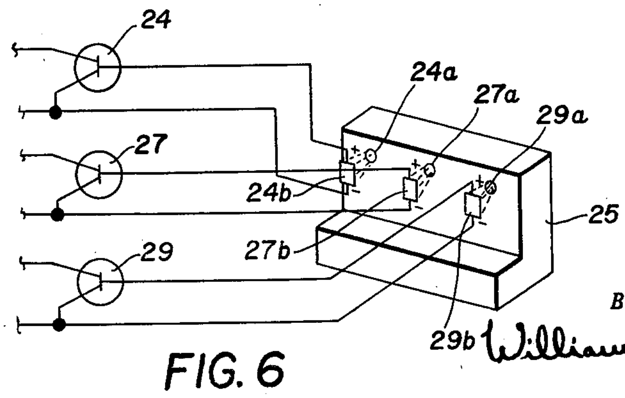
FIGURE 6 is a fragmentary schematic diagram of yet another modification of the diagram shown in FIGURE 1.

As an alternative to the direct line connections which I have provided in FIGURE 1 between electronic valves 24, 27 and 29, I recognize that photoelectric energization means may be more suitable under certain conditions. Accordingly, as shown in FIGURE 6, I utilize the pilot lights 24*a*, 27*a* and 29*a* of basic unit 25 to directly energize corresponding photoelectric cells 24*b*, 27*b* and 29*b*, which in turn trigger electronic valve means 24, 27 and 29 respectively, all in accordance with the system already described.

While hereinshown and described are preferred embodiments of the invention, it is contemplated that the invention is susceptible of embodiments in yet still other forms, and is applicable to a variety of situations which will be readily suggested to those skilled in the art upon reading the foregoing specification.

I claim:

1. In a telephone call priority indicator including timing means adapted to be actuated by an incoming telephone call to indicate the elapsed time said call remains unanswered, the improvement in actuation means comprising: a ferromagnetic drive cylinder, means to rotate said cylinder, ferromagnetic indicator means adjacent said cylinder; electromagnet means to establish driving engagement between said cylinder and said indicator means; and means to energize said electromagnet means responsive to an unanswered incoming telephone call, whereby movement of said indicator means continues until said call is answered.

2. The device set forth in claim 1, wherein said indicator comprises a ferromagnetic rod positioned tangential to said drive cylinder, whereby energization of said electromagnet couples said rod to said cylinder and rotation of said cylinder transmits linear movement to said rod, said linear movement being a function of the elapsed time of an awaiting call.

3. The device set forth in claim 1, wherein said indicator comprises a circular ferrous member having time lapse indicia about its periphery, said member being positioned tangential to said drive cylinder, whereby energization of said electromagnet couples said indicator to said cylinder and rotation of said cylinder transmits rotative movement to said indicator, said rotative movement being a function of the elapsed time of an awaiting call.

4. The device set forth in claim 1, wherein said indicator comprises a circular ferromagnetic member having time lapse indicia about its periphery, said member being positioned normal to said drive cylinder, whereby energization of said electromagnet couples said indicator to said cylinder and rotation of said cylinder transmits rotative movement to said indicator, said rotative movement being a function of the elapsed time of an awaiting call.

5. In a telephone call priority indicator adapted to be actuated by an incoming telephone call and to indicate the elasped time said call remains unanswered; the improvement comprising a ferromagnetic drive cylinder, means to rotate said drive cylinder, ferromagnetic time lapse indicator means adjacent said cylinder and adapted to be driven by the cylinder when magnetically attracted thereto, an electromagnet adapted to establish a magnetic attraction between said drive cylinder and said time lapse indicator means, a device to detect an unanswered incoming telephone call and to produce an output signal as long as the call remains unanswered, and circuit means responsive to said output signal and adapted to energize said electromagnet said magnetically attract the time lapse indicator means to the drive cylinder whereby the indicator means will be driven as long as the incoming call remains unanswered.

6. In a telephone call priority indicator including timing means for indicating the elapsed time an incoming call remains unanswered, the combination of a ferromagnetic drive cylinder, motor means to rotate said drive cylinder, ferromagnetic time lapse indicator means adjacent said cylinder and adapted to be driven by the cylinder when magnetically attracted thereto, an electromagnet adapted to establish a magnetic attraction between said drive cylinder and said time lapse indicator means, relay means adapted when energized to energize said electromagnet and establish magnetic attraction between said drive cylinder and said time lapse indicator means, means for detecting an incoming unanswered telephone call, and means including an electron valve connected to said detecting means for energizing the relay means as long as an incoming call remains unanswered.

7. The device set forth in claim 6 wherein said time lapse indicator means comprises a ferromagnetic rod, and visual indicia in association with said rod.

8. The device set forth in claim 6, wherein said time lapse indicator means comprises a ferromagnetic cylinder in tangential driving contact with said drive cylinder, and visual indicia about the periphery of said time lapse indicator.

9. The device set forth in claim 6 wherein said time lapse indicator means comprises a ferromagnetic cylinder aligned normal to said drive cylinder and in driving contact therewith, and visual indicia about the periphery of said indicator.

10. The device set forth in claim 6 and including a circuit for controlling said motor means to rotate said drive cylinder, and relay means in said last-mentioned circuit means for energizing the motor means to rotate the drive cylinder in response to an incoming unanswered telephone call.

11. The device set forth in claim 6 wherein said means for detecting an unanswered incoming telephone call includes pilot light means adapted when energized to indicate an unanswered call, and photoelectric cell means for sensing energization of said pilot light means.

References Cited in the file of this patent

UNITED STATES PATENTS

| | | |
|---|---|---|
| 1,249,154 | McQuarrie | Dec. 4, 1917 |
| 1,569,255 | Block | Jan. 12, 1926 |
| 2,239,819 | Holme | Apr. 29, 1941 |
| 2,638,980 | Dolph | May 19, 1953 |
| 2,736,886 | Radcliffe | Feb. 28, 1956 |